United States Patent
Tang

(10) Patent No.: US 12,004,101 B2
(45) Date of Patent: Jun. 4, 2024

(54) METHOD AND DEVICE FOR RECEIVING INFORMATION AND TRANSMITTING INFORMATION

(71) Applicant: GUANGDONG OPPO MOBILE TELECOMMUNICATIONS CORP., LTD., Dongguan (CN)

(72) Inventor: Hai Tang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 408 days.

(21) Appl. No.: 17/481,704

(22) Filed: Sep. 22, 2021

(65) Prior Publication Data
US 2022/0007316 A1 Jan. 6, 2022

Related U.S. Application Data

(63) Continuation of application No. PCT/CN2019/081605, filed on Apr. 4, 2019.

(51) Int. Cl.
*H04W 56/00* (2009.01)
*H04L 5/00* (2006.01)
*H04W 74/0816* (2024.01)

(52) U.S. Cl.
CPC ......... *H04W 56/001* (2013.01); *H04L 5/0051* (2013.01); *H04W 74/0816* (2013.01)

(58) Field of Classification Search
CPC ............ H04W 56/001; H04W 74/0816; H04L 5/0051; H04L 5/0048; H04L 5/0094; H04L 27/0006
See application file for complete search history.

(56) References Cited

U.S. PATENT DOCUMENTS

| 11,553,529 B2 * | 1/2023 | Xiong | H04L 1/1861 |
| 2020/0221405 A1 * | 7/2020 | Zarifi | H04W 52/50 |
| 2020/0344810 A1 * | 10/2020 | Xiong | H04W 74/0833 |
| 2020/0359422 A1 * | 11/2020 | Xie | H04W 74/0833 |

(Continued)

FOREIGN PATENT DOCUMENTS

| CN | 109309955 A | 2/2019 | |
| WO | 2018230879 A1 | 12/2018 | |
| WO | WO-2020118717 A1 * | 6/2020 | ........... H04L 5/0048 |

OTHER PUBLICATIONS

International Search Report and the Written Opinion Dated Dec. 27, 2019 From the International Searching Authority Re. Application No. PCTCN2019081605, 12 pages.

(Continued)

*Primary Examiner* — Mounir Moutaouakil
(74) *Attorney, Agent, or Firm* — BAYES PLLC

(57) ABSTRACT

A method and device for receiving information and transmitting information. The method includes a terminal device receiving indication information. The indication information indicates at least one of the following information for at least one target synchronization signal block (SSB): the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

18 Claims, 5 Drawing Sheets

(56) References Cited

U.S. PATENT DOCUMENTS

2021/0410151 A1* 12/2021 Chen .................. H04W 72/542
2022/0124646 A1* 4/2022 Liu ........................ H04W 4/40

OTHER PUBLICATIONS

"Initial access in NR unlicensed", Agenda Item: 7.2.2.2.2, Source: Huawei, HiSilicon, 3GPP TSG RAN WG1 Meeting #96bis, R1-1903929, Xi'an, China, Apr. 8-12, 2019, 14 pages.
"Discussion on initial access in NR-U", Agenda Item: 7.2.2.4.2, Source: Spreadtrum Communications, 3GPP TSG RAN WG1 Meeting #95, R1-1813078, Spokane, USA, Nov. 12-16, 2018, 7 pages.
"On SSB transmission in NR unlicensed", Agenda Item: 7.2.2.4.2, Source: Xiaomi, 3GPP TSG RAN WG1 Meeting #94bis, R1-1811416, Chengdu, China, Oct. 8-12, 2018, 3 pages.
"Feature lead summary #1 of initial access and mobility", Agenda Item: 7.2.2.4.2, Source: Charter Communications, 3GPP TSG RAN WG1 Meeting RAN#94BIS, R1-1811885, Chengdu, P. R. China, Oct. 8-12, 2018, 10 pages.

* cited by examiner

METHOD AND DEVICE FOR RECEIVING INFORMATION AND TRANSMITTING INFORMATION

CROSS-REFERENCE TO RELATED APPLICATION

This application is a continuation of International Application No. PCT/CN2019/081605, filed on Apr. 4, 2019, the entire contents of which are incorporated herein by reference.

BACKGROUND

Embodiments of the present disclosure relate to the field of communications and, in particular, to a method and a device for receiving information and transmitting information.

In 5G new radio (NR), a network device can indicate the location of resources of a synchronization signal block (SSB) by means of a bitmap.

However, NR unlicensed (NR-U) has a larger number of candidate transmission locations for SSBs to cope with the impact of listen before talk (LBT) failures and the restrictions caused by a smaller maximum number of SSBs that can actually be transmitted. If the issue is simply handled with a larger full bitmap (e.g., a bitmap with Y=20 bits), it will cost too many resources. Especially if the information is required at initial access, and the huge overhead of bits will be even less desirable.

Therefore, the method of indicating the transmission location of the SSB needs to be enhanced for the NR-U scenario.

SUMMARY

A method and device for receiving information and transmitting information are provided that not only can be applied to NR-U scenarios, but also to reduce signaling overhead.

In a first aspect, a method of receiving information is provided, including a terminal device receiving indication information, wherein the indication information indicates at least one of the following information for at least one target synchronization signal block (SSB); the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

In a second aspect, a method for transmitting information is provided, including a network device sending indication information, wherein the indication information indicates at least one of the following information for at least one target synchronization signal block (SSB): the at least one target SSB being a plurality of target SSBs, a number of candidate SSBs located in an interval between two adjacent target SSBs of the plurality of target SSBs; a number of the at least one target SSB; or a resource location of a first target SSB of the at least one target SSB.

In a third aspect, a terminal device is provided for performing the method in the first aspect or in each of its embodiments. Specifically, the terminal device includes functional modules for performing the method in the first aspect or in each of its embodiments.

In a fourth aspect, a network device is provided for performing the method in the second aspect or in each of its embodiments. Specifically, the network device includes functional modules for executing the method in the second aspect or in each of its embodiments.

In a fifth aspect, a communication device is provided, including a processor, a memory, and a transceiver. The memory is configured to store a computer program, and the processor is configured to call and run the computer program stored in the memory to cause the transceiver to perform the method in the first aspect or in each of its embodiments.

In a sixth aspect, a network device is provided, including a processor, a memory, and a transceiver. The memory is configured to store a computer program, and the processor is configured to call and run the computer program stored in the memory to cause the transceiver to perform the method in the second aspect or in each of its embodiments.

In a seventh aspect, a chip is provided for implementing the method in the first aspect or in each of its embodiments. Specifically, the chip includes a processor and an input interface for calling and running a computer program from memory to cause the input interface to perform a method as in the first aspect or in each of its embodiments.

In an eighth aspect, a chip is provided for implementing the method in the second aspect or in each of the embodiments thereof. Specifically, the chip includes a processor and an output interface for calling and running a computer program from a memory such that the output interface performs a method as in the second aspect or each of its embodiments.

In a ninth aspect, a computer-readable storage medium is provided for storing a computer program, which directs the computer to perform the method in any one of the first to second aspects or in each of its embodiments.

In a tenth aspect, a computer program product is provided, including computer program instructions that direct the computer to perform the method of any one of the first to second aspects or respective embodiments thereof as aforementioned.

In an eleventh aspect, a computer program is provided, which, when run on a computer, causes the computer to perform the method of any of the first to second aspects or respective embodiments thereof.

Based on the technical solutions, the terminal device is not only able to determine the resource location(s) of the at least one target SSB by means of the indication information, but is also able to effectively reduce signaling overhead.

DETAILED DESCRIPTION

The technical solutions in the embodiments of the disclosure will be described below in conjunction with the accompanying drawings in the embodiments of the disclosure, and it is clear that the embodiments described are a part of the embodiments of the disclosure, and not all of them. Based on the embodiments in the disclosure, all other embodiments obtained by a person of ordinary skill in the art without making creative efforts fall within the scope of protection of the disclosure.

Figure 1:
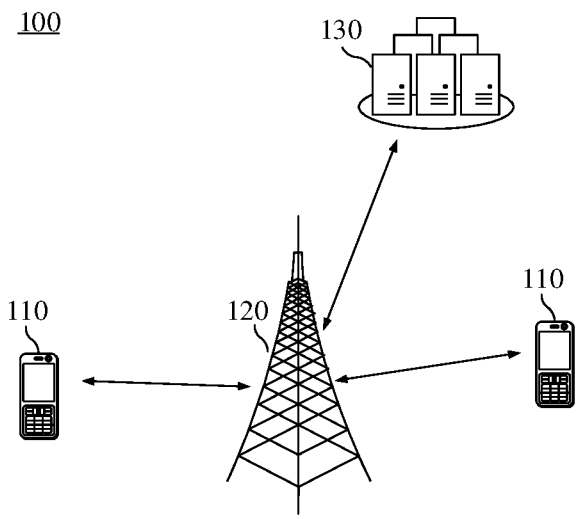
FIG. 1 is an example of an application scenario of the disclosure.

FIG. 1 is a schematic diagram showing an application scenario of an embodiment of the disclosure.

As shown in FIG. 1, a communication system 100 may include a terminal device 110 and a network device 120. The network device 120 may communicate with the terminal device 110 through an air interface. The terminal device 110 and the network device 120 support transmission of multiple services between the terminal device 110 and the network device 120.

Note that an embodiment of the disclosure is illustrated with the communication system 100 only for example, but is not limited thereto. That is, technical solutions of an embodiment of the disclosure can be applied to various communication systems, such as: a Global System of Mobile communication (GSM) system, a Code Division Multiple Access (CDMA) system, a Wideband Code Division Multiple Access (WCDMA) system, and a Wideband Code Division Multiple Access (WCDMA) system, a General Packet Radio Service (GPRS) system, a Long Term Evolution (LTE) system, LTE Time Division Duplex (TDD), a Universal Mobile Telecommunication System (UMTS), a Worldwide Interoperability for Microwave Access (WIMAX) communication system, a New Radio (NR) system, or a future 5G system.

Taking the 5G system as an example, the technical solution of an embodiment of the disclosure can be applied to a mode of Long Term Evolution (LTE) coverage in wide area and a mode of NR island coverage. Moreover, as LTE is massively deployed below 6 GHz, and very little sub-6 GHz spectrum is available for 5G. Hence, NR must study application of spectrum above 6 GHz, while high bands have limited coverage and fast signal fading. Additionally, to protect the mobile operators' investment in LTE in the early stage, an operation mode of tight interworking between LTE and NR is proposed.

The main application scenarios of 5G include Enhanced Mobile Broadband (eMBB), Ultra-Reliable and Low Latency Communication (URLLC), and Massive Machine Type of Communication (mMTC). In particular, the demand for eMBB, which targets users' access to multimedia content, services, and data, is growing very rapidly. As eMBB may be deployed in different scenarios, such as, indoor, urban, and rural, eMBB capabilities and demands vary widely, so it cannot be generalized and can be analyzed in detail with specific deployment scenarios. Typical applications of URLLC include industrial automation, power automation, telemedicine operation (e.g., surgery), traffic safety, security, and others. Typical features of mMTC include high connection density, small data volume, non-latency-critical services, low module cost, and long lifetime.

Additionally, since complete 5G NR coverage is difficult to obtain, the network coverage of an embodiment of the disclosure can be in the mode of wide area Long Term Evolution (LTE) coverage and NR island coverage. Also, to protect the mobile operator's upfront investment in LTE, a tight interworking mode between LTE and NR can further be used.

In the communication system 100 shown in FIG. 1, the network device 120 can be an access network device that communicates with the terminal device 110. The access network device may provide communication coverage for a specific geographic area and may communicate with terminal devices 110 (e.g., UEs) located within that coverage area.

Optionally, the network device 120 may be a base transceiver station (BTS) in a Global System of Mobile communication (GSM) system or Code Division Multiple Access (CDMA), or a base station (i.e., NodeB, NB) in a Wideband Code Division Multiple Access (WCDMA) system.

BTS). The network device 120 can be an evolutional Node B (eNB) in a Long Term Evolution (LTE) system. Optionally, the network device 120 may also be a Next Generation Radio Access Network (NG RAN), or a base station (i.e., gNB) in an NR system, or a radio controller in a Cloud Radio Access Network (CRAN). Optionally, the access network device can be a relay station, access point, in-vehicle device, wearable device, hub, switch, bridge, router, or network device in the future evolution of the Public Land Mobile Network (PLMN).

Optionally, the terminal device 110 may be any terminal device including but not limited to: a device configured to transmitting/receiving communication signals and/or an Internet of things (IoT) device connected via a wireline connection, such as a Public Switched Telephone Networks (PSTN), Digital Subscriber Line (DSL), digital cable, or direct cable connection; and/or via another data connection/network; and/or via a wireless interface, such as for cellular networks, Wireless Local Area Network (WLAN), digital television networks such as DVB-H networks, satellite networks, and AM-FM broadcast transmitters. A terminal device configured to communicate via a wireless interface may be referred to as a "wireless communication terminal," "wireless terminal," or "mobile terminal." Examples of a mobile terminal include, but are not limited to, a satellite phone or a cellular phone; a Personal Communications System (PCS) terminal that combines capabilities of a cellular radio telephony, data processing, fax, and data communication; a personal digital assistant (PDA) integrating a radio telephone, a pager, Internet/Intranet access, a Web browser, notepads, calendars, and/or a Global Positioning System (GPS) receiver; and a conventional laptop and/or handheld receivers, or other electronic devices that include a radio telephone transceiver. The terminal device may refer to an access terminal, user equipment (UE), user unit, user station, mobile station, mobile station, remote station, remote terminal, mobile device, user terminal, terminal, wireless communication device, user agent, or user device. The access terminal may be a cellular telephone, cordless telephone, Session Initiation Protocol (SIP) telephone, Wireless Local Loop (WLL) station, Personal Digital Assistant (PDA), handheld device with handheld devices with wireless communication capabilities, computing devices or other processing devices connected to wireless modems, in-vehicle device, wearable device, terminal device in 5G networks, or terminal device in future evolved PLMNs.

Optionally, the terminal devices 110 may perform direct Device to Device (D2D) communication to communicate with each other.

The wireless communication system 100 may also include a core network device 130 that communicates with the base station. The core network device 130 may be a 5G Core (5GC) device, such as an Access and Mobility Management Function (AMF), or an Authentication Server Function (AUSF), or a User Plane Function (UPF), or a Session Management Function (SMF). Optionally, the core network device 130 may also be an Evolved Packet Core (EPC) device of the LTE network, for example, a Session Management Function+Core Packet Gateway (SMF+PGW-C) device. Note that the SMF+PGW-C can perform the functions that both the SMF and the PGW-C can perform.

Optionally, the functional units in the communication system 100 may communicate with each other by establishing a connection through a next generation network (NG) interface.

Figure 2:
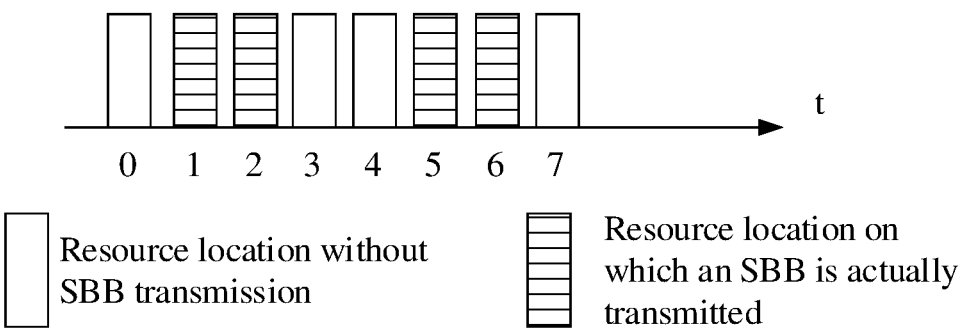
FIG. 2 and FIG. 3 are schematic block diagrams showing resource locations of actual transmitted SSBs of an embodiment of the disclosure.

For example, the terminal device establishes an air interface connection with the access network device for transmitting user-plane data and control-plane signaling through the NR interface. The terminal device can establish a control-plane signaling connection with the AMF through an NG interface 1 (N1). The access network device, such as a next-generation radio access base station (gNB), can establish a user-plane data connection with the UPF through an NG interface 3 (N3). The access network device can establish control-plane signaling connection with AMF through an NG interface 2 (N2). The UPF can establish control-plane signaling connection with the SMF through NG interface 4 (N4). The UPF can interact with data network for user-plane data through an NG interface 6 (N6). The AMF can establish control-plane signaling connection with the SMF through an NG interface 11 (N11). The SMF can establish a control-plane signaling connection with the PCF through an NG interface 7 (N7). Note that what is shown in FIG. 2 is only an example of an architecture diagram. In addition to the functional units shown in FIG. 1, the network architecture may include other functional units or functional entities, e.g., the core network device may also include other functional units such as a unified data management (UDM), which are not specifically limited by the embodiments of this disclosure.

FIG. 1 illustrates a base station, a core network device, and two terminal devices. Optionally, the wireless communication system 100 may include multiple base station devices, and each base station may include other numbers of terminal devices within a coverage area of each base station, without limitation in an embodiment of the disclosure.

Note that the devices in the network/system in an embodiment of the disclosure that have communication functions can be referred to as communication devices. Taking the communication system 100 illustrated in FIG. 1 as an example, the communication devices may include network devices 120 and terminal devices 110 with communication functions. The network devices 120 and terminal devices 110 may be the devices aforementioned and will not be described again herein. The communication devices may also include other devices in the communication system 100, such as network controllers, mobility management entities, and other network entities, which are not limited in an embodiment of the disclosure.

Note that the terms "system" and "network" are often used interchangeably herein. The term "and/or" in this document is only a description of an association relationship of associated objects, indicating that three relationships can exist. For example, A and/or B, which can indicate the following three cases: A alone, both A and B, and B alone. Additionally, the character "l" in this document generally indicates that associated objects before and after are in an "or" relationship.

In the communication system 100 shown in FIG. 1, the network device 120 can send a Synchronization Signal Block (SSB) to the terminal device 110. The SSB is also called a Synchronization Signal/Physical Broadcast Channel Block (SS/PBCH block).

Taking the communication system 100 shown in FIG. 1 as an example of 5G NR, a specific embodiment of sending SSBs from the network device 120 to the terminal device 110 is explained.

In 5G NR, for frequency bands below 6 GHz, there are at most 8 indices of SSBs, which means that below 6 GHz, there are at most 8 candidate transmission locations for SSBs in one SSB transmission period, and at most 8 SSBs can be transmitted at 8 candidate transmission locations.

Note that an actual number of SSBs sent by the network device 120 in one SSB transmission period depends on the implementation of the network device 120, except that the maximum number of transmissions is limited to 8. With this design, how can the terminal device 110 determine the actual transmission locations of SSBs for the terminal device 110 to use for rate matching when receiving physical downlink control channel (PDCCH) and physical downlink shared channel (PDSCH)? Specifically, for the frequency bands below 6 GHz, the protocol first predefines 8 candidate transmission locations of SSBs within 5 milliseconds (ms), corresponding to SSB index 0 to index 7. The terminal device 110 can determine the SSB transmission situation using an 8-bit bitmap through broadcasting or a specific Radio Resource Control (RRC) signal, where each bit represents a transmission status or non-transmission status of an SSB.

For example, as shown in FIG. 2, a bitmap of 01100110 can be used to indicate the SSB transmission situation shown in FIG. 2, where 0 indicates that no SSB was sent at the candidate transmission location and 1 indicates that an SSB was sent at the candidate transmission location.

In 5G NR, for the frequency bands above 6 GHz, there are at most 64 indices of SSBs, which means that above 6 GHz, there are at most 64 candidate transmission locations of SSBs within one SSB transmission period, and at most 64 SSBs are transmitted at 64 candidate transmission locations. In fact, for the frequency band above 6 GHz, the terminal device 110 can determine the transmission situation of these SSBs in a similar way as for the case below 6 GHz, i.e., the protocol first predefines the candidate transmission locations of 64 SSBs within 5 ms, corresponding to SSB index 0 to SSB index 63, respectively. The terminal device 110 can determine the specific SSB transmission situation through broadcasting or a specific RRC proprietary signal. The difference lies in the form and interpretation of the signaling used by the UE to determine whether to transmit the SSBs and which transmission locations are used to transmit.

Specifically, above 6 GHz, the terminal device 110 can be notified of the specific SSB transmission locations for the terminal device 110 by means of a 16-bit bitmap via broadcasting. In particular, the 16 bits are divided into two groups, each group being a bitmap consisting of 8 bits. Correspondingly, the 64 SSBs are divided into 8 groups, each group having 8 SSBs. In a specific embodiment, 8 bits of the 16 bits indicate which of the 8 groups of SSBs are sent by means of the bitmap, and the other 8 bits of the 16 bits indicate transmission situations of the 8 SSBs in each group by means of a bitmap.

Figure 3:
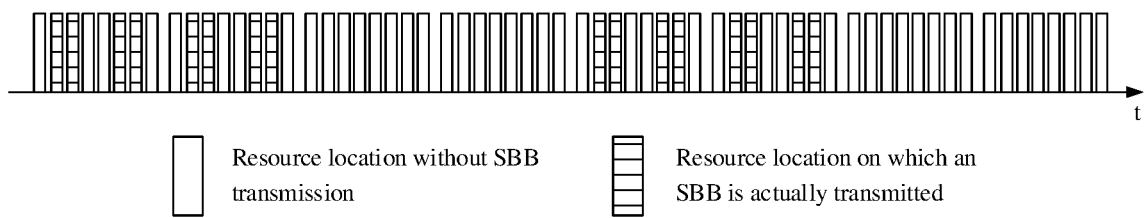

For example, as shown in FIG. 3, a bitmap of 11001100 can be used to indicate transmission situations of each SSB group shown in FIG. 3. A bitmap of 01100110 may be used to indicate transmission situations of the SSBs in each group shown in FIG. 3. Specifically, as shown in FIG. 3, the 64 SSBs are also divided into 8 groups with 8 SSBs in each group, where groups 1, 2, 5, and 6 have SSBs sent by the network device 120. The SSBs in each group are sent at the 2nd, 3rd, 6th, and 7th transmission locations.

Of course, the terminal device 110 can also determine the specific SSB transmission location using a 64 bit bitmap through specific RRC signaling, where each bit represents a transmission situation of the sending or not sending one SSB.

It is important to note that a unified form of channel and/or channel description is defined in the NR-U system. Taking the NR-U Discovery Reference Signal (DRS) or DRS description as an example, the DRS includes the Synchronization Signal Block (SSB), a Control Resource Set (CORESET) that can include Remaining System Information (RMSI), a Physical Downlink Control Channel (PDCCH), and a Physical Downlink Control Channel (PDCCH), Other System Information (OSI), and/or CORESET, PDCCH, and PDSCH of paging, and Channel State Information Reference Signal (CSI-RS).

The embodiment where the terminal device 110 receives SSBs sent from the network device 120 when the terminal device 110 is operating in a licensed band has been explained above. Since spectrum resources in the licensed bands are very precious, how to implement SSB transmission on the unlicensed bands is an urgent technical problem in the field.

Since the channel resources on the unlicensed spectrum are shared, and the devices using these shared resources need to listen to and obtain free channels before utilizing them, it is difficult to ensure the periodic transmission and reception of synchronous signal blocks at fixed locations in this case. Because the locations of successful Listen Before Talk (LBT) of a transmitting device is unpredictable, and failure of LBT is likely to cause the failure of transmission and reception of the synchronization signal block. As a consequence, in some practical embodiments, multiple candidate transmission locations for sending SSBs can be provided, so that the network device 120 still has enough candidate transmission locations available for sending SSBs after a successful LBT, and avoid the impact of LBT failure on SSB reception accordingly.

For example, Y candidate locations for SSB transmission are preconfigured, and, among these Y candidate locations, SSBs can be transmitted only at the candidate locations of the SSBs after a successful LBT for SSB transmission, and at most X SSBs can be transmitted on these Y candidate locations for SSB transmission.

As it is clear from the above description that a larger number of SSB candidate transmission locations are configured within a transmission window of a DRS in an unlicensed band, a question arises as to how to indicate the actual transmission locations of SSBs within these larger number of SSB candidate transmission locations for use in, for example, rate matching.

In one embodiment, the design of 5G NR in the licensed band can be followed, i.e., a larger bitmap is configured to directly indicate which SSBs are transmitted at which SSB candidate locations. For example, when the number of SSB candidate transmission locations is Y=20, a Y=20 bitmap is configured to indicate which SSBs are transmitted at these Y=20 locations. Obviously, such a scheme brings a large overhead, even if the maximum number of SSBs transmitted in a DRS period is limited, e.g., if at most X=8 SSBs are transmitted, the approach still requires a large bitmap (e.g., Y=20 bits) for indication.

Additionally, in 5G NR, when the terminal device 110 monitors PDCCHs on the Type0-PDCCH common search space (CSS), or when the terminal device 110 is receiving PDSCHs scheduled by the Type0-PDCCH common search space, the terminal device 110 presumes that these PDCCH resources and/or PDSCH's resources will not have SSB's transmitted on them, as described in detail in 3GPP protocol 38.213, section 10, and 38.214, section 5.1.4. However, in the NR-U study, this constraint is too restrictive for the resource utilization within the DRS, so how the terminal device can obtain the current SSB transmission situation when monitoring PDCCH and/or PDSCH of the RMSI of the NR-U system, and how to use information of the SSB transmission situation for rate matching when monitoring and decoding the PDCCH and/or PDSCH is an urgent problem to be studied and solved.

Note that in 5G NR, which of the candidate transmission locations for SSBs can be used by the network device for SSB transmission is dependent on the network device implementation, which is to maximize flexibility of network device implementation. However, in NR-U, this flexibility comes at a cost.

To facilitate illustration of the technical effects of the solution of the disclosure, the following is a detailed description of which of the candidate transmission locations of SSBs can be used by the network device for SSB transmission in NR-U, and how SSBs can be sent.

First, in NR-U, if spacing between individual SSB transmission locations is relatively too large, for example, if a second SSB is transmitted after a number of milliseconds (e.g., 3 ms) after a first SSB has been transmitted, it is likely that the second SSB transmission will fail due to other devices occupying that unlicensed spectrum channel during this time interval. Therefore, the transmission interval between two consecutive SSBs should not be too long, i.e., SSBs should be transmitted on adjacent SSB candidate transmission locations.

For example, in an SSB transmission period, Y=20 candidate transmission locations are configured for SSBs. When only N=4 SSBs are transmitted at these Y=20 candidate transmission locations, these N=4 SSBs are transmitted at four consecutive SSB candidate locations.

Second, since the DRS in the NR-U system can include PDCCH and PDSCH of RSMI, and/or PDCCH and PDSCH of OSI and paging, and CSI-RS reference signals in addition to SSBs, the case of SSBs not transmitted on adjacent SSB candidate locations between two adjacent SSBs can be further considered, and sufficient the time and frequency resources between the two adjacent SSBs can be allocated for the PDCCH/PDSCH of RMSI and other channels and signals. Further, since the PDCCH and PDSCH of RSMI, as well as the PDCCH and PDSCH of OSI or paging, and the CSI-RS reference signals associated with each SSB in DRS occupy the same size of resources, when considering the case of SSBs not transmitted on adjacent SSB candidate locations, positions of the intervals between individual SSBs are also arranged in equal intervals.

For example, in an SSB transmission period, Y=20 candidate transmission locations are configured for SSBs. When only N=4 SSBs are transmitted at these Y=20 candidate transmission locations, these N=4 SSBs are transmitted at discrete 4 SSB candidate locations, with Z candidate transmission locations not for SSB transmission located in each interval between candidate transmission locations for SSB transmission, where Z can be a non-negative integer. Note that if Z=0, it corresponds to the case where the SSBs are transmitted on consecutive SSB candidate transmission locations.

Again, consider the case where more than 1 SSB is included in a DRS. In this case, the signal and channel resources included in the DRS need rate matching for resource mapping for more than 1 SSB.

For example, in one SSB transmission period, Y=20 SSB candidate transmission locations are configured. When only N=4 SSBs are transmitted at these Y=20 candidate transmission locations, these N=4 SSBs are transmitted at four consecutive SSB candidate locations. In particular, the 1st SSB and the 2nd SSB are quasi-co-located (QCL), that is, other channels or signals associated with these two SSBs need rate matching based on the resources of these two SSBs. The 3rd SSB and the 4th SSB are QCL, which means that other channels or signals associated with these two SSBs need rate matching based on the resources of these two SSBs.

Based on the considerations, in a specific method for the indication, the aforementioned method of SSB transmission in the candidate locations of 8 SSBs indicated by 8 bit bitmap in 5G NR is not applicable in NR-U, because more candidate transmission locations of SSBs are allocated to cope with the effect of LBT failure, and the upper limit on the maximum number of SSBs that can actually be transmitted is smaller. and if a larger full bitmap (e.g., a bitmap with Y=20 bits) is simply applied, as analyzed before, it would make the resource overhead too large, especially if information of the bitmap is needed at the initial access, and a larger overhead of bits would be even less desirable. Therefore, further, an indication method for indicating the SSB transmission location needs to be optimized for the specific design considerations.

By designing a specific indication mechanism, the disclosure provides an indication method which can indicate transmission situations of SSBs within a DRS period using fewer bits, and can effectively save signaling overhead.

Note that, in an embodiment of the disclosure, the "candidate transmission location of SSB" is also referred to as "candidate SSB resource location" or "candidate location of SSB" or "SSB candidate transmission location," which is not specifically limited in this disclosure. It should also be understood that in NR-U, network devices can transmit SSBs at the candidate SSB resource locations obtained via successful LBT.

Additionally, for the sake of description, an SSB actually transmitted by the network device to the terminal device at a candidate SSB resource location is referred to as a target SSB, or the SSB actually transmitted as determined by the terminal device at a candidate SSB resource location is referred to as the target SSB. Additionally, the candidate SSB resource locations can also be referred to as the resource locations that can be used to transmit the target SSB, which can be pre-defined resource locations.

Figure 4:
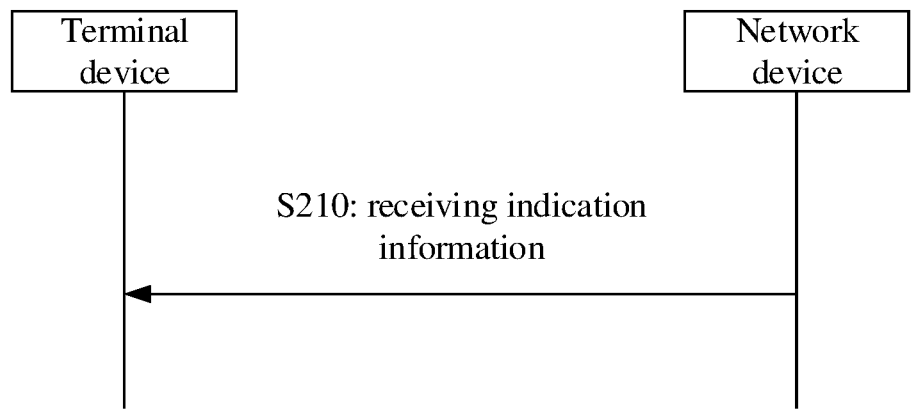
FIG. 4 is a schematic interaction diagram of a wireless communication method of an embodiment of the disclosure.

FIG. 4 is a schematic interaction diagram of a wireless communication method 200 according to an embodiment of the disclosure. The method 200 may be performed interactively by a terminal device and a network device. The terminal device shown in FIG. 4 may be a terminal device as shown in FIG. 1, and the network device shown in FIG. 4 may be an access network device as shown in FIG. 1.

As shown in FIG. 4, the method 200 includes that S210, a terminal device receiving indication information from a network device; wherein the indication information is configured to indicate at least one of the following information for at least one target SSB: the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

Assuming that the number of the at least one target SSB is N, the terminal device, when determining resource locations of the at least one target SSB by means of the indication information, takes the first target SSB and N−1 SSBs preceding the first target SSB as the at least one target SSB, or takes the first target SSB and N−1 SSBs following the first target SSB as the at least one target SSB.

In an embodiment of the disclosure, the content of the indication information is defined based on the transmission characteristics of SSBs in NR-U, such that the terminal device, by means of the indication information, not only can determine the resource location(s) of the at least one target SSB, but also effectively reduce the signaling overhead.

Specifically, the indication information is specifically used to indicate at least one of the following information for the at least one target SSB: the at least one target SSB being a plurality of target SSBs, a number of candidate SSBs located in an interval between two adjacent target SSBs of the plurality of target SSBs during a first period; a number of the at least one target SSB in the first period; or the resource location of the first target SSB during the first period, wherein the number of the candidate SSBs within the first period is a predetermined value.

At this point, the resource location of the first target SSB is the resource location of the Kth candidate SSB within the first period, wherein K is a non-negative integer and K is less than or equal to the total number of candidate SSBs within the first period. In other words, the indication information may be used to indicate that the resource location of the first target SSB in the first period is the resource location of the Kth candidate SSB in the first period, wherein K is a non-negative integer and K is less than or equal to the total number of candidate SSBs in the first period.

Note that the first period is an SSB period or a discovery reference signal (DRS) period. However, the disclosure is not limited to this. Further, the number of the candidate SSBs in the first period may be any positive integer. For example, the number of the candidate SSBs in the first period includes, but is not limited to, 16, 20, 24, or 32.

The number of the candidate SSBs located in an interval between two adjacent target SSBs is any one of 0, 1, 3, or 7; or the number of the candidate SSBs located in an interval between two adjacent target SSBs is any one of 0, 1, or 3; or the number of the candidate SSBs located in an interval between two adjacent target SSBs is any one of 0, 1, 2, or 3; or the number of the candidate SSBs located in an interval between two adjacent target SSBs is any one of 0 or 1. However, an embodiment of the disclosure is not limited to this. For example, the number of the candidate SSBs located in an interval between two adjacent target SSBs may be any one of 0, 1, or 2.

Specifically, a selection range (e.g., 0, 1, 3, and 7) of the number of the candidate SSBs located in an interval between two adjacent target SSBs may be specified in advance. That is, when the network device sends the indication information to the terminal device, and the indication information is used at least for indicating that the at least one target SSB is a plurality of target SSBs and a number of candidate SSBs located in an interval between two adjacent target SSBs in the plurality of target SSBs, a value within a fixed range of values may be determined as the number of the candidate SSBs located in an interval between two adjacent target SSBs.

Of course, in other alternative embodiments, the range of values may not be specified. For example, the network device may determine in real time the number of the candidate SSBs located in an interval between two adjacent target SSBs based on the current channel conditions and indicate to the terminal device.

The number of the at least one target SSB is any one of 1, 2, or 4, or the number of the at least one target SSB is any one of 1, 2, 4, or 8, or the number of the at least one target SSB is any one of 2, 4, 6, or 8.

Similar to the number of the candidate SSBs located in an interval between two adjacent target SSBs as aforementioned, the network device may determine the number of the at least one target SSB within a fixed range of values or may not determine the number of the at least one target SSB within the fixed range of values. In other words, the number of at least one target SSB includes, but is not limited to, 1, 2, 4, 6, or 8.

It should be understood, of course, that the specific numbers are only specific examples of the disclosure and should not be construed as a limitation of the disclosure.

For example, the number of the candidate SSBs in the first period may also be other values such as 40.

For example, the number of at least one target SSB may also be other values such as 10 or 12.

Also, for example, the selection range for the number of at least one target SSB may also be other ranges such as 1 and 2.

The following is an illustration, in conjunction with the accompanying drawings, of an embodiment of the terminal device determining the resource location(s) of the at least one target SSB when the indication information is configured to indicate only one of the following information for the at least one target SSB: the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

Note that embodiments of the disclosure do not specifically limit how the indication information is transmitted. For example, in some embodiments of the disclosure, the terminal device receives a physical broadcast channel (PBCH) including the indication information; or the terminal device receives a master information block (MIB) including the indication information; or the terminal device receives a radio resource control (RRC) signaling including the indication information. In other embodiments of the disclosure, the indication information indicates at least one of the following information for the at least one target SSB via the a different demodulation reference signal (DMRS) of a physical broadcast channel (PBCH): the at least one target SSB being a plurality of target SSBs, a number of candidate SSBs located in an interval between two adjacent target SSBs in the plurality of target SSBs; a number of the at least one target SSBs; or a resource location of a first target SSB of the at least one target SSB. In other words, the indication information may be carried via PBCH, specifically, also may be carried via MIB, via specific RRC signaling, or downlink control information (DCI). Additionally, the indication information may be carried via DMRS of the PBCH, for example, via S1 DMRS sequences of PBCH when the indication information needs to indicate M1 types of situations.

Example 1: The indication information is used only to indicate that the at least one target SSB is a plurality of target SSBs and a number of candidate SSBs located in an interval between two adjacent target SSBs in the plurality of target SSBs.

That is, the network device transmits the indication information to the terminal device, and the terminal device uses the indication information to determine the number of the candidate SSBs located in an interval between two adjacent target SSBs in the plurality of target SSBs.

For example, the indication information may indicate that Z candidate locations of SSBs are located in an interval between two adjacent target SSBs actually transmitted during the first period (SSB period, or DRS period). The number Z may be 0/1/3/7, corresponding to successive SSB transmissions, one target SSB transmission for every 2 successive SSB candidate transmission locations (i.e., spaced apart by one SSB candidate transmission location), one target SSB transmission for every 4 consecutive SSB candidate transmission locations (i.e., spaced apart by three SSB candidate transmission locations), and one target SSB transmission for every 8 consecutive SSB candidate transmission locations (i.e., spaced apart by seven SSB candidate transmission locations). More generally, Z may be a positive integer.

The terminal device, after obtaining the indication information, determines one SSB candidate location for each interval of Z SSB candidate locations among the predefined Y SSB candidate locations, and uses these determined SSB candidate locations as resource locations for the at least one target SSB. The resource location(s) of the at least one target SSB is configured for transmission of the at least one target SSB.

In some possible embodiments, the terminal device may determine a first SSB of an LBT success as the first target SSB of the at least one target SSB, or may determine a first detected SSB as the first target SSB of the at least one target SSB.

Furthermore, the number of at least one target SSB may be a value preconfigured by the network device or a value specified by the protocol. In other words, it may be specified that the total number of resource locations of the at least one target SSB is at most X. Alternatively, the at least one target SSB is less than or equal to a predetermined threshold value X. For example, the X includes, but is not limited to, 4 and 8.

Further, the terminal device may determine the resource location(s) of the at least one target SSB based on the resource location of the first target SSB of the at least one target SSB, the number of the at least one target SSB, and the indication information.

Figure 5:
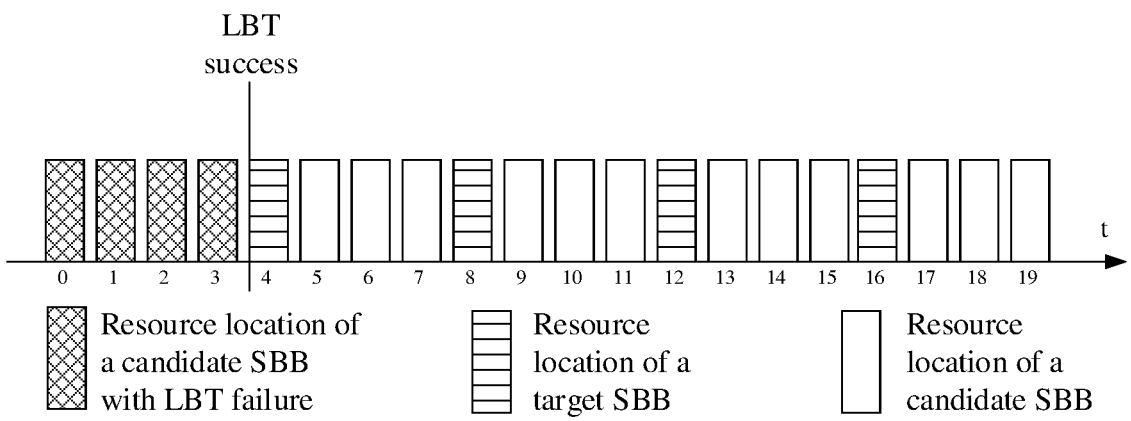
FIG. 5 to FIG. 10 are schematic block diagrams showing resource locations of a plurality of target SSBs of embodiments of the disclosure.
Figure 6:
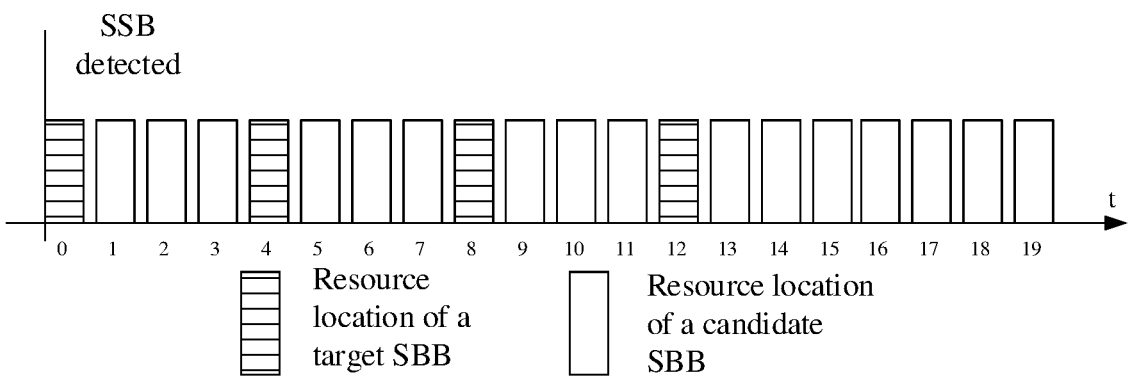

FIGS. 5 and 6 are schematic block diagrams showing relationships between the locations of the target SSBs in an embodiment of the disclosure.

As shown in FIG. 5, Y equals 20, Z equals 3, and X equals 4.

Assuming that the terminal device succeeds in LBT at the candidate location numbered with an index 4, the terminal device determines the candidate location numbered with an index 4, and each of the candidate locations (i.e., candidate location numbered with an index 8, candidate location numbered with an index 12, and candidate location numbered with an index 16) spaced apart by three candidate locations located after the candidate location numbered with an index 4 as resource locations for the at least one target SSB.

As shown in FIG. 6, Y equals 20, Z equals 3, and X equals 4.

The terminal device determines the first candidate SSB (candidate location numbered with an index 0) within a detected channel occupancy time (COT) as the first target SSB in the at least one target SSB, then the terminal device determines the candidate location numbered with an index 0, and each of the candidate locations (candidate location numbered with an index 4, candidate location numbered with an index 8, and candidate location numbered with an index 12) spaced apart by three candidate locations after the candidate location numbered with an index 0 as resource locations of the at least one target SSB.

Of course, the terminal device may also determine the first candidate SSB within the COT that satisfies the following condition as the first target SSB of the at least one target SSB: a quotient of an index of the resource location of the candidate SSB and D is k, wherein k is a positive integer, and a value of D include, but are not limited to 2, 4, or 8.

In other words, when the terminal device detects a COT, in determining resource location(s) of the at least one target SSB, the terminal device determines in that COT a first SSB candidate location numbered with an index that satisfies index=2k or 4k or 8k (k is a positive integer), and each of SSB candidate locations spaced apart by Z SSB candidate locations after the first SSB candidate location, to be the resource location(s) for the at least one target SSB.

In an embodiment of the disclosure, the indication information may be indicated by X1 bits, such as 00 for continuous transmission, 01 for spacing of an interval of 1 SSB candidate location, 10 for spacing of an interval of 3 SSB candidate locations, and 11 for spacing of an interval of 7 SSB candidate locations. Or, for example, 00 indicates continuous transmission, 01 indicates spacing with an interval of 1 SSB candidate location, 10 indicates spacing with an interval of 2 SSB candidate locations, and 11 indicates spacing with an interval of 3 SSB candidate locations.

Figure 7:
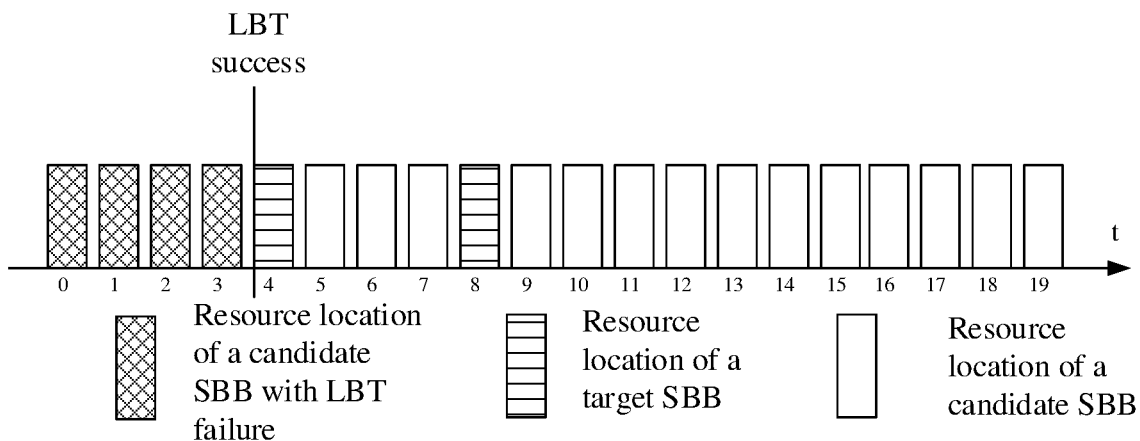
Figure 8:
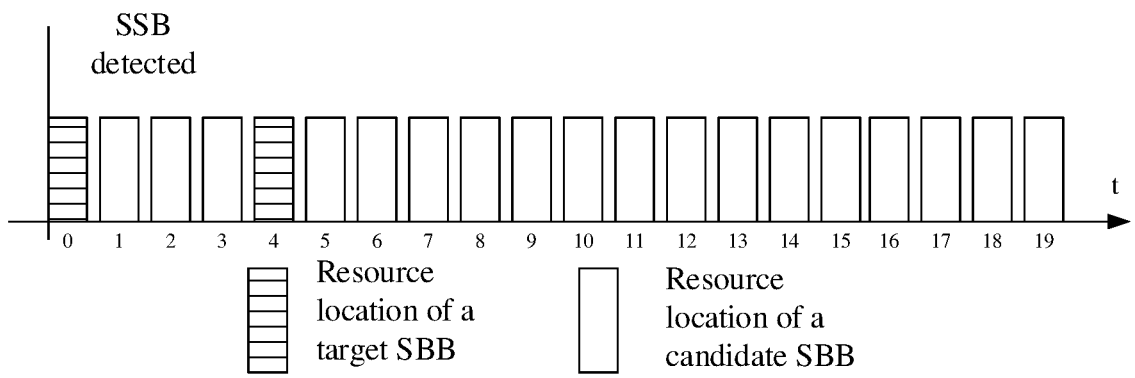

Note that FIGS. 5 and 6 are only two examples of the disclosure and should not be construed as limitations of the disclosure. For example, as shown in FIG. 7 and FIG. 8, the X may also be equal to 2.

Example 2: The indication information is used only to indicate the number of the at least one target SSB.

That is, the indication information indicates the number N of SSBs actually transmitted. For example, N may be 1/2/4/8, i.e., corresponding to 1, 2, 4, or 8 SSBs transmitted in a first period. The first period may be, for example, an SSB period or a DRS period. More generally, N may take a positive integer less than or equal to X, where X is a predefined maximum number of SSBs that can be transmitted.

The network device transmits the indication information to the terminal device, and the terminal device may determine the number of SSBs actually transmitted using the indication information.

In an embodiment of the disclosure, when the at least one target SSB includes a plurality of target SSBs, the number Z of candidate SSBs located in an interval between two adjacent target SSBs of the plurality of target SSBs may be a network pre-configured value or a protocol-specified value. For example, the at least one target SSB may be contiguous on the resource locations of the candidate SSBs. That is, after the terminal device obtains the indication information, the terminal device may determine the candidate locations of N consecutive SSBs in the information of the predefined Y SSB candidate locations and use the resources of the determined candidate locations of these SSBs as the resource locations of the at least one target SSB.

Further, the terminal device may determine a first SSB of a successful LBT as the first target SSB of the at least one target SSB, and may also determine a first detected SSB as the first target SSB of the at least one target SSB.

Further, the terminal device may determine the resource location(s) of the at least one target SSB based on the resource location of the first target SSB of the at least one target SSB, the number of the candidate SSBs located in an interval between two adjacent target SSBs, and the indication information.

Figure 9:
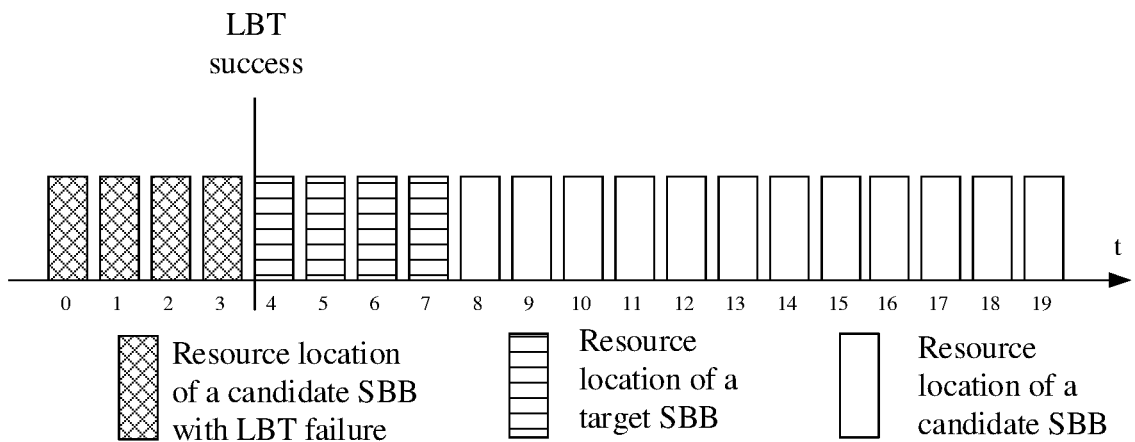
Figure 10:
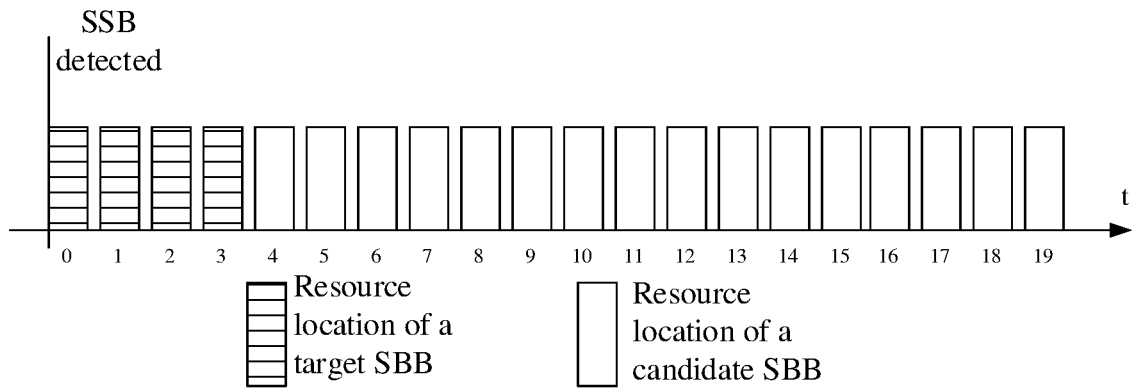

FIGS. 9 and 10 are schematic block diagrams showing the resource location(s) of the at least one target SSB in an embodiment of the disclosure.

As shown in FIG. 9, Y equals 20, Z equals 0, and X equals 4.

Assuming that the terminal device has a successful LBT at the candidate location numbered with an index 4, the terminal device determines the candidate location numbered with an index 4, and each of the candidate locations (candidate location numbered with an index 5, candidate location numbered with an index 6, and candidate location numbered with an index 7) spaced apart by three candidate locations located after the candidate location numbered with an index 4 as resource locations for the at least one target SSB.

As shown in FIG. 10, Y equals 20, Z equals 0, and X equals 4.

The terminal device determines the first candidate SSB (candidate location numbered with an index 0) within the detected channel occupancy time (COT) as the first target SSB in the at least one target SSB, then the terminal device determines the candidate location numbered with an index 0, and each of three consecutive candidate locations (candidate location numbered with an index 5, candidate location numbered with an index 6, and candidate location numbered with an index 7) after the candidate location numbered with an index 0 as resource locations of the at least one target SSB.

Of course, the terminal device may also determine as the first candidate SSB within the COT that satisfies the following condition as the first target SSB of the at least one target SSB: a quotient of an index of the resource location of the candidate SSB and D is k, wherein k is a positive integer, wherein the value of D include, but are not limited to, 2, 4, and 8.

In other words, when the terminal device detects a COT, in determining resource location(s) of the at least one target SSB, the terminal device determines in that COT a first SSB candidate location numbered with an index that satisfies index=2k or 4k or 8k (k is a positive integer), and each of SSB candidate locations spaced apart by Z SSB candidate locations after the first SSB candidate location, to be the resource location(s) for the at least one target SSB.

In an embodiment of the disclosure, the indication information may be indicated using X2 bits.

For example, the indication information may indicate that the number of the at least one target SSB includes 1/2/4/8 SSBs. Specifically. For example, 00 indicates that the number of the at least one target SSB is 1, 01 indicates that the number of the at least one target SSB is 2, 10 indicates that the number of the at least one target SSB is 4, and 11 indicates that the number of the at least one target SSB number of 8.

Further, for example, the indication information may indicate that the number of the at least one target SSB includes 2/4/6/8 SSBs. Specifically, for example, i.e., 00 indicates that the number of the at least one target SSB is 2, 01 indicates that the number of the at least one target SSB is 4, 10 indicates that the number of the at least one target SSB is 6, and 11 indicates that the number of the at least one target SSB is 8.

Another example is to indicate using 3 bits where 000 to 111 represents the number of the at least one target SSB from 1 to 8.

Example 3: The indication information is used only to indicate the resource location of the first target SSB of at least one target SSB.

The network device transmits the indication information to the terminal device, and the terminal device may determine the transmission location of the first transmitted target SSB using the indication information.

For example, the indication information indicates that the transmission location of the first transmitted SSB is the Kth of a predefined Y SSB transmission candidate locations, K being less than or equal to Y. In particular, K may be assigned the value 2k+1 or 2 (k+1), where k is a non-negative integer. K may be assigned the value 4k+1 or 4 (k+1), where k is a non-negative integer. K may be assigned the value 8k+1 or 8 (k+1), where k is a non-negative integer. More generally, K can be assigned a positive integer less than Y, where Y is predefined candidate locations for SSB transmission.

As a result, the terminal device, after obtaining the indication information, may determine among the predefined Y candidate locations of SSBs, a candidate location of an SSB after every interval of Z candidate locations of SSBs starting from the Kth candidate location of SSBs for transmission, and use the resources of these determined candidate locations of SSBs as the resource location(s) of the at least one target SSB.

In some possible embodiments, when the at least one target SSB includes a plurality of target SSBs, the number Z of candidate SSBs located in an interval between two adjacent target SSBs of the plurality of target SSBs may be a network pre-configured value or a protocol-specified value. For example, the at least one target SSB may be contiguous on the resource locations of the candidate SSBs. That is, after the terminal device obtains the indication information, the terminal device may determine the candidate locations of N consecutive SSBs in the information of the predefined Y SSB candidate locations and use the resources of the determined candidate locations of these SSBs as the resource locations of the at least one target SSB.

Furthermore, the number of the at least one target SSB may be a value preconfigured by the network device or a value specified by the protocol. In other words, the total number of resource locations of the at least one target SSB may be specified to be at most X. Alternatively, the at least one target SSB is less than or equal to a predetermined threshold value X. For example, the X includes, but is not limited to, 4 and 8.

Further, the terminal device may determine the resource location(s) of the at least one target SSB based on the indication information, the number of the at least one target SSB, and the number of the candidate SSBs located in an interval between two adjacent target SSBs.

In this embodiment, the indication information may be indicated using X3 bits.

For example, 000 indicates that the resource location of the first target SSB is the resource location of the first candidate SSB, 001 indicates that the resource location of the first target SSB is the resource location of the fifth candidate SSB, 010 indicates that the resource location of the first target SSB is the resource location of the ninth candidate SSB, 011 indicates that the resource location of the first target SSB is the resource location of the resource location of the 13th candidate SSB, and 100 indicates that the resource location of the 1st target SSB is the resource location of the 17th candidate SSB.

Additionally, for example, 00 indicates that the resource location of the 1st target SSB is the resource location of the 1st candidate SSB, 01 indicates that the resource location of the 1st target SSB is the resource location of the 5th candidate SSB, 10 indicates that the resource location of the 1st target SSB is the resource location of the 9th candidate SSB, and 11 indicates that the resource location of the 1st target SSB is the resource location of the 13th resource location of the candidate SSB.

Further, for example, the resource location of the 1st target SSB may be indicated by the 3-bit information as the resource location of the 1 st/3rd/5th/7th/9th/11th/13th/15th candidate SSB.

Another example is that the resource location of the 1st target SSB may be indicated by 4-bit information as the resource location of the 1st/3rd/5th/7th/9th/11th/13th/15th/17th/19th candidate SSB.

Some embodiment of the disclosure is described in detail above in conjunction with the accompanying drawings. However, the disclosure is not limited to the specific details in the aforementioned embodiments. A variety of simple variants of the technical solution of the application can be made within the technical conception of the application, all of which are within the scope of protection of the disclosure.

For example, each specific technical feature described in the aforementioned specific embodiment can be combined in any suitable way without contradiction. In order to avoid unnecessary repetition, the various possible combinations are not described separately in this disclosure.

For example, the various embodiments of this disclosure can also be combined in any way, as long as they do not depart from the idea of this disclosure, and should also be considered as the content disclosed in this disclosure.

The combination of the aforementioned three embodiments is described in the following.

Example 4: The indication information is configured to indicate a transmission interval of the at least one target SSB and the number of the at least one target SSBs.

In this case, the terminal device may determine the first detected SSB as the first target SSB of the at least one target SSB. Or, the terminal device may determine a first candidate SSB within the detected channel occupancy time (COT) as the first target SSB of the at least one target SSB. Or, the terminal device may determine a first candidate SSB within the COT that satisfies the following conditions as the first target SSB among the at least one target SSB: a quotient of an index of the resource location of the candidate SSB and D is k, wherein k is a positive integer, wherein D has a value of 2, 4, or 8.

Further, the terminal device may determine the resource location of the at least one SSB based on the indication information and the resource location of the first target SSB.

TABLE 1

| Numbering of the indication information: U | Number of the at least one target SSB: N | Number of candidate SSBs located in an interval between two adjacent target SSBs |
|---|---|---|
| 0 | 1 | — |
| 1 | 2 | 0 |
| 2 | 2 | 1 |
| 3 | 2 | 3 |
| 4 | 4 | 0 |
| 5 | 4 | 1 |
| 6 | 4 | 3 |

As shown in Table 1, both the number and the transmission interval of the at least one target SSBs can be considered. For example, the numbering U of the indication information equal to 1 indicates that the number of the at least one target SSB is 2 and the number of the candidate SSBs located in an interval between two adjacent target SSBs is 1. That is, the number of the at least one target SSBs that the indication information can indicate is 1/2/4, and the number of the candidate SSBs located in an interval between two adjacent target SSBs that the indication information can indicate can be –/0/1/3, wherein "-" may be used to indicate that the number of candidate SSBs located in an interval between two adjacent target SSBs is none.

TABLE 2

| Numbering of joint indication: U | Number of the at least one target SSB: N | Number of candidate SSBs located in an interval between two adjacent target SSBs |
|---|---|---|
| 0 | 1 | — |
| 1 | 2 | 0 |
| 2 | 2 | 1 |
| 3 | 4 | 0 |
| 4 | 4 | 1 |
| 5 | 8 | 0 |
| 6 | 8 | 1 |

As shown in Table 2, both the number and the transmission interval of the at least one target SSBs can be considered. For example, the numbering U of the joint indication equal to 1 indicates that the number of the at least one target SSB is 2 and the number of the candidate SSBs located in an interval between two adjacent target SSBs is 0. That is, the number of the at least one target SSBs that can be indicated by the indication information can be 1/2/4/8, and the number of the candidate SSBs located in an interval between two adjacent target SSBs that hat can be indicated by the indication information can be –/0/1, where, "-" may be used to indicate that the number of candidate SSBs located in an interval between two adjacent target SSBs is none.

Example 5: The indication information is configured to indicate the transmission interval of the at least one target SSB and the resource location of the first target SSB of the at least one target SSB.

In this case, the number of the at least one target SSB may be specified to be less than or equal to a predetermined threshold. For example, the predetermined threshold may be 4 or 8.

Further, the terminal device may determine the resource location(s) of the at least one target SSB based on the indication information and the number of the at least one target SSB.

Example 6: The indication information is configured to indicate the number of at least one target SSB and the resource location of the first target SSB of the at least one target SSB.

In this case, the candidate SSBs that are located in an interval between two adjacent target SSBs may be specified. For example, the at least one target SSB is contiguous on the resource locations of the candidate SSBs.

Further, the terminal device may determine the resource location(s) of the at least one target SSB based on the indication information and the specified candidate SSBs located in an interval between two adjacent target SSBs.

Example 7: The indication information is configured to indicate the following information of the at least one SSB: the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

In this case, the terminal device can determine the resource location(s) of the at least one target SSB directly based on the indication information.

Note that the application does not additionally limit the specific use of the indication information.

In some embodiments of the disclosure, the terminal device receives the at least one target SSB according to the indication information. Meanwhile, the terminal device may detect, according to the indication information, a Physical Downlink Control Channel (PDCCH) and/or a Physical Downlink Shared Channel (PDSCH). Downlink Shared Channel (PDSCH). For example, the terminal device determines, based on the indication information, that no PDSCH will be transmitted at resource location(s) that overlaps with resource location(s) of the at least one target SSB; and/or the terminal device does not detect a PDCCH at resource location(s) that overlaps or partially overlaps with resource location(s) of the at least one target SSB, based on the indication information; and/or the terminal device, when detecting PDCCHs, does not detect a PDCCH if the PDCCH overlaps or partially overlaps with resource location(s) of at least one target SSB. Correspondingly, the network device, according to the indication information, does not send a transmission of a PDSCH at the resource location(s) that overlaps or partially overlap with resource location(s) of the at least one target SSB; and/or the network device, when PDCCHs are detected, according to the indication information, does not transmit PDCCHs at resource location(s) that overlap or partially overlap with the resource location(s) of the at least one target SSB.

Alternatively, when the terminal device determines the resource location(s) of the at least one target SSB, when the terminal device detects PDCCHs, if a PDCCH or candidates of the PDCCH, overlaps with the resource location(s) of the at least one target SSB, the terminal device does not detect a PDCCH on that PDCCH or the candidate of the PDCCH. When the terminal device detects PDSCHs, if resources of PDSCHs overlap with the resource location(s) of the at least one target SSB, the terminal device determines that no PDSCH will be transmitted on those resources.

In some other embodiments of the disclosure, the terminal device measures the at least one target SSB based on the indication information.

That is, in addition to detecting as well as receiving PDCCHs and PDSCHs using the indication information, it can be applied to indicate the actual transmission situations of SSBs in a measurement configuration. The indication information being indicated partially or fully in a broadcast message or an RRC reconfiguration message (e.g., being indicated in a measurement object configuration message). The UE can reduce unnecessary SSB detection and measurements based on the transmission information of SSBs, i.e., the UE can only measure SSBs on the indicated SSB candidate transmission locations, thus reducing the measurement complexity and energy consumption overhead of the UE.

In some embodiments of the disclosure, the terminal device receives the indication information for detecting a PDCCH and/or a PDSCH and the indication information for measuring an SSB, respectively.

Alternatively, if the terminal device needs to both detect as well as receive PDCCHs and PDSCHs using the indication information and measure the SSBs using the indication information, the network device sends to the terminal device the indication information for detecting as well as receiving PDCCHs and PDSCHs and the indication information for measuring SSBs, respectively.

In some embodiments of the disclosure, the at least one target SSB is a plurality of target SSBs, and at least some of the plurality of target SSBs are QCL. That is, other channels or signals associated with the at least some of the target SSBs require rate matching based on the resource(s) of the at least some of the target SSBs.

Figure 11:
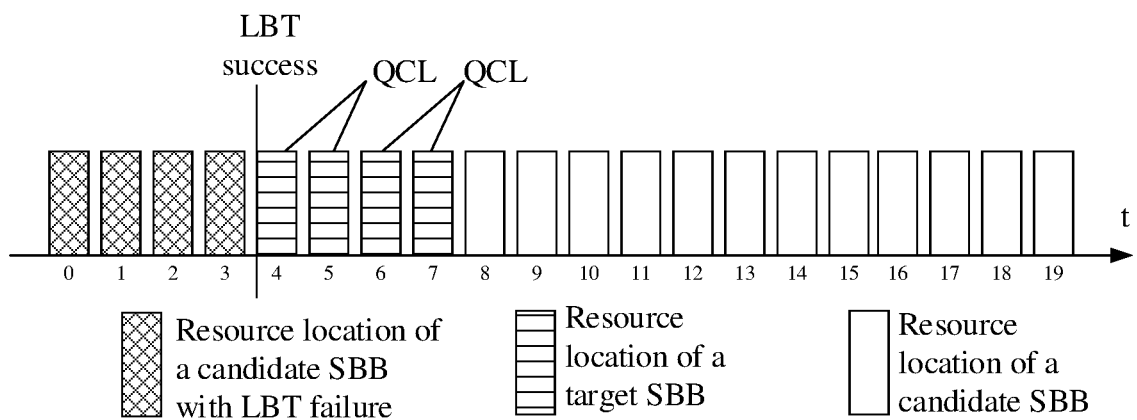
FIG. 11 is a schematic block diagram showing at least some target SSBs of the plurality of target SSBs being QCLs according to an embodiment of the disclosure.

FIG. 11 is a schematic block diagram showing that at least some of the target SSBs in the plurality of target SSBs are QCL in an embodiment of the disclosure.

As shown in FIG. 11, the resource location(s) of the at least one target SSB include resource locations numbered with an index 4/5/6/7. Wherein, the target SSBs at the resource locations numbered 4 and numbered 5 are QCL, and the target SSBs at the resource locations numbered 6 and numbered 7 are QCL.

Method embodiments of the disclosure are described in detail above in conjunction with FIGS. 1 to 11, and the device embodiments of the disclosure are described in detail below in conjunction with FIGS. 12 to 13.

Figure 12:
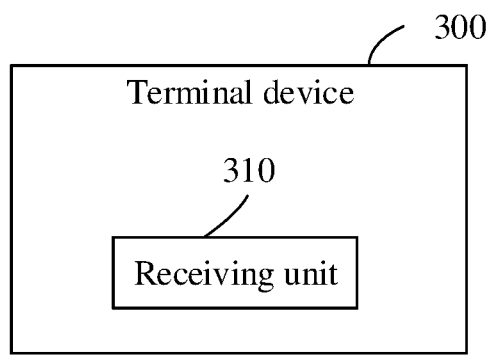
FIG. 12 is a schematic block diagram showing a terminal device of an embodiment of the disclosure.

FIG. 12 is a schematic block diagram showing a terminal device 300 of an embodiment of the disclosure.

Specifically, as shown in FIG. 12, the terminal device 300 may include a receiving unit 310 for receiving indication information, the indication information for indicating at least one of the following information for at least one target synchronization signal block (SSB): the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

In some embodiments of the disclosure, the indication information is specifically used to indicate at least one of the following information for the at least one target SSB: the at least one target SSB being a plurality of target SSBs, a number of candidate SSBs located in an interval between two adjacent target SSBs of the plurality of target SSBs during a first period; a number of the at least one target SSB during the first period; or the resource location of the first target SSB during the first period; wherein the number of the candidate SSBs within the first period is a predetermined value.

In some embodiments of the disclosure, the first period is an SSB period or a DRS period.

In some embodiments of the disclosure, the number of the candidate SSBs within the first period may be 16, 20, 24, or 32.

In some embodiments of the disclosure, the resource location of the first target SSB is the resource location of the Kth candidate SSB within the first period, wherein K is a non-negative integer, and K is less than or equal to the total number of candidate SSBs within the first period.

In some embodiments of the disclosure, the number of the candidate SSBs located in an interval between two adjacent target SSBs is any one of 0, 1, 3, or 7; or the number of the candidate SSBs located in an interval between two adjacent target SSBs is any one of 0, 1, or 3; or the number of the candidate SSBs located in an interval between two adjacent target SSBs is any one of 0, 1, 2, or 3; or the number of the candidate SSBs located in an interval between two adjacent target SSBs is any one of 0 or 1.

In some embodiments of the disclosure, the number of the at least one target SSB is any one of 1, 2, or 4, or the number of the at least one target SSB is any one of 1, 2, 4, or 8, or the number of the at least one target SSB is any one of 2, 4, 6, or 8.

In some embodiments of the disclosure, the indication information is used only to indicate at least one of the following information for the at least one target SSB: a transmission interval of the at least one target SSB; or the number of the at least one target SSB.

In some embodiments of the disclosure, the terminal device further includes a determination unit for determining a first detected SSB as the first target SSB of the at least one target SSB.

In some embodiments of the disclosure, the terminal device further includes a determination unit for determining a first candidate SSB within a detected channel occupancy time (COT) as the first target SSB among the at least one target SSBs.

In some embodiments of the disclosure, the terminal device further includes a determination unit for determining as the first target SSB of the at least one target SSB a first candidate SSB within the COT that satisfies the following conditions: the quotient of an index of the resource location of the candidate SSB and D is k, wherein k is a positive integer, wherein D has a value of 2, 4, or 8.

In some embodiments of the disclosure, the indication information is used only to indicate at least one of the following information for the at least one target SSB: the transmission interval of at least one target synchronization signal block (SSB); or the resource location of a first target SSB of the at least one target SSB.

In some embodiments of the disclosure, the number of the at least one target SSB is less than or equal to a predetermined threshold.

In some embodiments of the disclosure, the predetermined threshold is 4 or 8.

In some embodiments of the disclosure, the indication information is used only to indicate at least one of the following information for the at least one target SSB: a number of the at least one target SSB; or a resource location of the first of the at least one target SSBs.

In some embodiments of the disclosure, the at least one target SSB is contiguous on the resource locations of the candidate SSBs.

In some embodiments of the disclosure, the receiving unit 310 is further used to receive the at least one target SSB according to the indication information.

In some embodiments of the disclosure, the receiving unit 310 is further used to detect a physical downlink control channel (PDCCH) and/or a physical downlink shared channel (PDSCH) according to the indication information.

In some embodiments of the disclosure, the receiving unit 310 is specifically used to determine, based on the indication information, that no PDSCH will be transmitted at a resource location that overlaps with the resource location(s) of the at least one target SSB; and/or not detect a PDCCH at a resource location that overlaps or partially overlaps with the resource location(s) of the at least one target SSB according to the indication information; and/or not detect a PDCCH if the PDCCH overlaps or partially overlaps with the resource location(s) of the at least one target SSB according to the indication information when detecting PDCCHs.

In some embodiments of the disclosure, the receiving unit 310 is further used to measure the at least one target SSB based on the indication information.

In some embodiments of the disclosure, the receiving unit 310 is specifically used to receive the indication information for detecting a PDCCH and/or a PDSCH and the indication information for measuring an SSB, respectively.

In some embodiments of the disclosure, the receiving unit 310 is specifically used to receive a physical broadcast channel (PBCH) including the indication information; or receive a master information block (MIB) including the indication information; or receive a radio resource control (RRC) signaling including the indication information.

In some embodiments of the disclosure, the indication information indicates, via a different demodulation reference signal (DMRS) of a physical broadcast channel (PBCH), at least one of the following information for the at least one target SSB: the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

Note that the device embodiments and the method embodiments may correspond to each other, and similar descriptions may refer to the method embodiment. Specifically, the terminal device 300 shown in FIG. 12 may correspond to the corresponding subject performing the method 200 of the embodiments of the disclosure, and the aforementioned and other operations and/or functions of the various units in the terminal device 300 are intended to implement the corresponding processes in each of the methods in FIG. 4, respectively, and will not be repeated herein for the sake of brevity.

Figure 13:
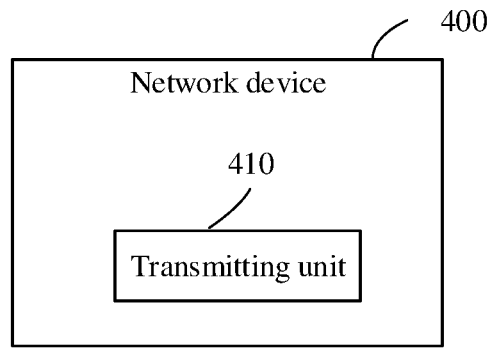
FIG. 13 is a schematic block diagram showing a network device of an embodiment of the disclosure.

FIG. 13 is a schematic block diagram of a network device 400 of an embodiment of the disclosure.

Specifically, as shown in FIG. 13, the network device 400 may include a transmitting unit 410 for sending indication information, wherein the indication information indicates at least one of the following information for at least one target synchronization signal block (SSB): the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

In some embodiments of the disclosure, the indication information is specifically used to indicate at least one of the following information for the at least one target SSB: the at least one target SSB being a plurality of target SSBs, a number of candidate SSBs located in an interval between two adjacent target SSBs of the plurality of target SSBs during a first period; a number of the at least one target SSB during the first period; or the resource location of the first target SSB during the first period; wherein the number of the candidate SSBs within the first period is a predetermined value.

In some embodiments of the disclosure, the first period is an SSB period or a discovery reference signal (DRS) period.

In some embodiments of the disclosure, the number of the candidate SSBs within the first period is 16 or 20 or 24 or 32.

In some embodiments of the disclosure, the resource location of the first target SSB is the resource location of the Kth candidate SSB within the first period, wherein K is a non-negative integer and K is less than or equal to the total number of candidate SSBs within the first period.

In some embodiments of the disclosure, the number of the candidate SSBs located in an interval between two adjacent target SSBs is any one of 0, 1, 3, or 7, or the number of the candidate SSBs located in an interval between two adjacent target SSBs is any one of 0, 1, or 3, or the number of the candidate SSBs located in an interval between two adjacent target SSBs is any one of 0, 1, 2, or 3, or the number of the candidate SSBs located in an interval between two adjacent target SSBs is any one of 0 or 1.

In some embodiments of the disclosure, the number of the at least one target SSB is any one of 1, 2, or 4, or the number of the at least one target SSB is any one of 1, 2, 4, or 8, or the number of the at least one target SSB is any one of 2, 4, 6, or 8.

In some embodiments of the disclosure, the indication information is used only to indicate at least one of the following information for the at least one target SSB: a transmission interval of the at least one target SSB; or a number of the at least one target SSB.

In some embodiments of the disclosure, the indication information is used only to indicate at least one of the following information for the at least one target SSB: the transmission interval of the at least one target synchronization signal block (SSB); or the resource location of the first target SSB of the at least one target SSB.

In some embodiments of the disclosure, the number of the at least one target SSB is less than or equal to a predetermined threshold.

In some embodiments of the disclosure, the predetermined threshold is 4 or 8.

In some embodiments of the disclosure, the indication information is used only to indicate at least one of the following information for the at least one target SSB: a number of the at least one target SSB; or a resource location of the first of the at least one target SSBs.

In some embodiments of the disclosure, the at least one target SSB is contiguous on the resource locations of the candidate SSBs.

In some embodiments of the disclosure, the transmitting unit 410 is further used to send the at least one target SSB in accordance with the indication information.

In some embodiments of the disclosure, the transmitting unit 410 is further used to transmit a physical downlink control channel (PDCCH) and/or a physical downlink shared channel (PDSCH) according to the indication information.

In some embodiments of the disclosure, the transmitting unit 410 is specifically used to: prevent from sending a PDSCH at a resource location overlapping with the resource location(s) of the at least one target SSB according to the indication information; and/or prevent from sending a PDCCH at a resource location that overlaps or partially overlaps with the resource location(s) of the at least one target SSB according to the indication information; and/or prevent from sending a PDCCH if the PDCCH overlaps or partially overlaps with the resource location(s) of at least one target SSB when detecting PDCCHs according to the indication information.

In some embodiments of the disclosure, the transmitting unit 410 is specifically used to send the indication information for detecting a PDCCH and/or a PDSCH and the indication information for measuring an SSB, respectively.

In some embodiments of the disclosure, the transmitting unit 410 is specifically used to: send to the terminal device a physical broadcast channel (PBCH) including the indication information; or send to the terminal device a master information block (MIB) including the indication information; or send to the terminal device a radio resource control (RRC) signaling including the indication information.

In some embodiments of the disclosure, the indication information indicates, via a different demodulation reference signal (DMRS) of a physical broadcast channel (PBCH), at least one of the following information for the at least one target SSB, the at least one target SSB being a plurality of target SSBs, a number of candidate SSBs located in an interval between two adjacent target SSBs in the plurality of target SSBs; a number of the at least one target SSB; or a resource location of a first target SSB of the at least one target SSB.

Note that the device embodiment and the method embodiment may correspond to each other, and similar descriptions may refer to the method embodiment. Specifically, the network device 400 shown in FIG. 13 may correspond to the corresponding subject matter performing the method 200 of the embodiments of the disclosure, and the foregoing and other operations and/or functions of the various units in the network device 400 are intended to implement the corresponding processes in each of the methods in FIG. 4, respectively, and will not be repeated herein for brevity.

The communication device of an embodiment of the disclosure is described above in connection with FIG. 12 and FIG. 13 from the perspective of functional modules. Note that the functional modules may be implemented in the form of hardware, in the form of software instructions, or in the form of a combination of hardware and software modules.

Specifically, the steps of the method embodiments in embodiments of the disclosure may be realized by integrated logic circuitry in the form of hardware in a processor and/or instructions in the form of software, and the steps of the method disclosed in conjunction with an embodiment of the disclosure may be directly embodied as being performed by a hardware decoding processor, or by a combination of hardware and software modules in the decoding processor.

Optionally, the software modules may be located in random-access memory, flash memory, read-only memory, programmable read-only memory, electrically erasable programmable memory, registers, and other storage media well established in the art. The storage medium is located in a memory, and a processor reads information in the memory and completes the steps in the aforementioned method embodiments in conjunction with its hardware.

For example, the determination unit in an embodiment of the disclosure may be implemented by the processor, and the transmitting unit and/or the receiving unit may be implemented by the transceiver.

Figure 14:
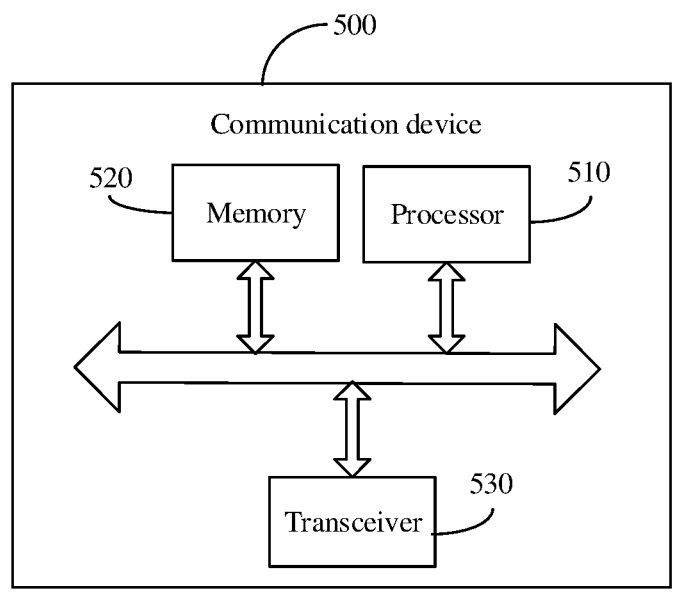
FIG. 14 is a schematic block diagram showing a communication device of an embodiment of the disclosure.

FIG. 14 is a schematic structure diagram of the communication device 500 of an embodiment of the disclosure. The communication device 500 shown in FIG. 14 includes a processor 510, which may call and run a computer program from memory to implement the method in an embodiment of the disclosure.

Optionally, as shown in FIG. 14, the communication device 500 may also include a memory 520. The memory 520 may be used to store indication information, and may also be used to store code, instructions, etc. executed by the processor 510. In particular, the processor 510 may call and run a computer program from the memory 520 to implement the methods in the embodiments of the disclosure.

In particular, the memory 520 may be a separate device from the processor 510 or may be integrated in the processor 510.

Optionally, as shown in FIG. 14, the communication device 500 may also include a transceiver 530. The processor 510 may control the transceiver 530 to communicate with other devices, specifically, to send information or data to, or receive information or data from, other devices.

In particular, the transceiver 530 may include a transmitter and a receiver. The transceiver 530 may further include an antenna, and the number of antennas may be one or more.

Optionally, the communication device 500 may be a terminal device of an embodiment of the disclosure, and the communication device 500 may realize the corresponding processes implemented by the terminal device in each method of the embodiments of the disclosure. That is, the communication device 500 of an embodiment of the disclosure may correspond to the terminal device 300 of an embodiment of the disclosure, and may correspond to a subject matter that performs the corresponding processes in the method 200 according to an embodiment of the disclosure, and for the sake of brevity, will not be repeated here.

Optionally, the communication device 500 may be a network device of an embodiment of the disclosure, and the communication device 500 may realize the corresponding process implemented by the network device in each method of embodiments of the disclosure. In other words, the communication device 500 of an embodiment of the disclosure may correspond to the network device 400 of an embodiment of the disclosure, and may correspond to a subject matter that performs the method 200 according to an embodiment of the disclosure, which will not be repeated here for the sake of brevity.

Note that the various components in the communication device 500 are connected via a bus system, wherein the bus system includes a power bus, a control bus, and a status signal bus in addition to a data bus.

Additionally, an embodiment of the disclosure provides a chip, which may be an integrated circuit chip having a signal processing capability and can implement or perform the respective methods, steps and logical block diagrams disclosed in the embodiments of the disclosure.

Optionally, the chip may be applied to various communication devices such that a communication device having the chip installed can perform the respective methods, steps, and logical block diagrams disclosed in the embodiments of the disclosure.

Figure 15:
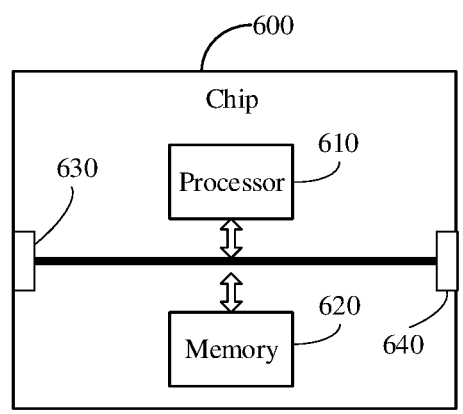
FIG. 15 is a schematic block diagram showing a chip of an embodiment of the disclosure.

FIG. 15 is a schematic structure diagram of a chip according to an embodiment of the disclosure.

The chip 600 shown in FIG. 15 includes a processor 610 that can call and run a computer program from memory to implement the methods in the embodiments of the disclosure.

Optionally, as shown in FIG. 15, the chip 600 may also include a memory 620. wherein the processor 610 may call and run a computer program from the memory 620 to implement the method in an embodiment of the disclosure. The memory 620 may be used to store instruction information and may also be used to store code and instructions executed by the processor 610.

In particular, the memory 620 may be a separate device from the processor 610 or may be integrated in the processor 610.

Optionally, the chip 600 may also include an input interface 630. In particular, the processor 610 may control the input interface 630 to communicate with other devices or chips, specifically, to obtain information or data sent by other devices or chips.

Optionally, the chip 600 may also include an output interface 640, wherein the processor 610 may control the output interface 640 to communicate with other devices or chips, specifically, to output information or data to other devices or chips.

Optionally, the chip can be applied to the network device in an embodiment of the disclosure, and the chip can implement the corresponding processes implemented by the network device in each of the methods of the embodiments of the disclosure, and for the sake of brevity, will not be repeated here.

Optionally, the chip can be applied to the terminal device in an embodiment of the disclosure, and the chip can realize the corresponding process implemented by the terminal device in each method of the embodiments of the disclosure, and for the sake of brevity, it will not be repeated here.

Note that the chip referred to in an embodiment of the disclosure may also be referred to as a system scale chip, system chip, chip system, or system-on-a-chip. It should also be understood that the various components in the chip 600 are connected via a bus system, wherein the bus system includes a power bus, a control bus and a status signal bus in addition to a data bus.

The processor may include, but are not limited to a general-purpose processors, Digital Signal Processor (DSP), Application Specific Integrated Circuit (ASIC), Field Programmable Gate Array (FPGA), or other programmable logic devices, discrete gate, transistor logic devices, or discrete hardware components.

The processor may be used to implement or perform each of the methods, steps, and logic block diagrams disclosed in embodiments of the disclosure. The steps of the method disclosed in combination with the embodiments of the disclosure can be directly embodied as performed by a hardware decoding processor or performed with a combination of hardware and software modules in the decoding processor. The software modules can be located in random access memory, flash memory, read-only memory, programmable read-only memory or erasable programmable memory, registers, and other storage media well established in the art. The storage medium is located in a memory and a processor reads the information in the memory and performs the steps of the aforementioned method in combination with its hardware.

The memory includes, but is not limited to a volatile memory and/or non-volatile memory. Wherein, the non-volatile memory may be Read-Only Memory (ROM), Programmable ROM (PROM), Erasable Programmable Read-Only Memory (EPROM), Electrically EPROM (EEPROM), or flash memory. The volatile memory may be Random Access Memory (RAM), which is used as an external cache. By way of illustration, but not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), synch link DRAM (SLDRAM), and Direct Rambus RAM (DR RAM).

Note that the memory of the systems and methods described herein is intended to include, but is not limited to, these and any other suitable types of memory.

An embodiment of the disclosure provides a computer-readable storage medium for storing a computer program. The computer-readable storage medium stores one or more programs, the one or more programs including instructions that, when executed by a portable electronic device including a plurality of applications, enable the portable electronic device to perform the method of the embodiment shown in the method 200.

Optionally, the computer-readable storage medium can be applied to the network device in the embodiments of the disclosure, and the computer program causes the computer to perform the corresponding processes implemented by the network device in the various methods of the embodiments of the disclosure, which will not be repeated herein for brevity.

Optionally, the computer-readable storage medium may be applied to the mobile terminal/terminal device in an embodiment of the disclosure, and the computer program enables a computer to perform the corresponding processes implemented by the mobile terminal/terminal device in each of the methods of the embodiments of the disclosure, which will not be repeated herein for brevity.

An embodiment of the disclosure provides a computer program product including a computer program.

Optionally, the computer program product may be applied to the network device in an embodiment of the disclosure, and the computer program causes the computer to perform the corresponding processes implemented by the network device in the respective methods of the embodiments of the disclosure, which will not be described herein for brevity.

Optionally, the computer program product may be applied to the mobile terminal/terminal device in an embodiment of the disclosure, and the computer program causes a computer to perform the corresponding processes implemented by the mobile terminal/terminal device in each of the methods of the embodiments of the disclosure, which will not be repeated herein for brevity.

An embodiment of the disclosure provides a computer program. When being executed by the computer, the computer program causes the computer to perform the methods of the embodiments shown in methods 300 to 500.

Optionally, the computer program may be applied to the network device in an embodiment of the disclosure, and when the computer program is run on a computer, causes the computer to perform the corresponding processes implemented by the network device in each of the methods of the embodiments of the disclosure, which will not be repeated herein for brevity.

An embodiment of the disclosure also provides a communication system. The communication system may include a terminal device 300 as shown in FIG. 12 and a network device 400 as shown in FIG. 13. In particular, the terminal device 300 may be used to perform the corresponding functions implemented by the terminal device in the method 200 aforementioned. The network device 400 may be used to perform the corresponding functions implemented by the network device in the method 200 aforementioned. The corresponding functions are not repeated herein for the sake of brevity.

Note that the term "system" in the description may also be referred to as "network management architecture" or "network system".

It should also be understood that the terms used in the embodiments of the disclosure and appended claims are used solely for the purpose of describing particular embodiments and are not intended to limit the embodiments of the disclosures.

For example, the singular forms of "a", "said", "above" and "the" as used in the embodiments of the disclosures and appended claims are also intended to include plural forms, unless the context clearly indicates otherwise.

Those of skill in the art can appreciate that the units and algorithmic steps of the various examples described in conjunction with the embodiments disclosed herein are capable of being implemented in electronic hardware, or a combination of computer software and electronic hardware. Whether these functions are performed in hardware or software depends on the particular application and design constraints of a technical solution. A person with ordinary skills in the art may use different methods to implement the described functions for each particular application, but such implementation should not be considered outside the scope of an embodiment of the disclosures.

If implemented as a software functional unit and sold or used as a stand-alone product, it may be stored in a computer-readable storage medium. It is understood that the technical solution of an embodiment of the disclosure, or that part of the technical solution which essentially or contributes to the prior art, may be embodied in the form of a software product stored in a storage medium including a number of instructions to cause a computer device (which may be a personal computer, a server, or a network device, etc.) to perform all or some of the steps of the method described in an embodiment of the disclosure. The storage media includes USB flash drive, removable hard disk, read-only memory, random access memory, disk or CD-ROM, and other media that can store program code.

It will be clear to those skilled in the art that, for the convenience and brevity of the description, the specific working processes of the systems, devices and units described above can be referred to the corresponding processes in the preceding method embodiments and will not be repeated here.

In several embodiments provided in this disclosure, note that the disclosed systems, devices, and methods, can be implemented in other ways.

For example, separation of units or modules or components in the aforementioned device embodiments is only a logical functional division, and the actual implementation can be divided in another way. For example, multiple units or modules or components can be combined or can be integrated into another system, or some units or modules or components can be discarded, or not implemented.

For example, the units/modules/components described above as separate/display components may or may not be physically separated, i.e., they may be located in one place, or they may be distributed to a plurality of network units. Some or all of these units/modules/components can be selected according to practical needs to achieve the purpose of an embodiment of the disclosure.

Finally, note that the mutual coupling or direct coupling or communication connection shown or discussed above may be indirect coupling or communication connection through some interface, device or unit, which may be electrical, mechanical, or in other forms.

The above description is only some specific implementations of embodiments of the disclosure. The scope of protection of the embodiments of the disclosure, however, is not limited to this. Any person with ordinary skills in the art can easily think of changes or substitutions within the technical scope disclosed by the embodiments of the disclosure, which should be covered by the scope of protection of the embodiments of the disclosure. Therefore, the scope of protection of the embodiments of the disclosure shall be subject to the scope of protection of the claims.

What is claimed is:

1. A method for receiving information, comprising:
a terminal device receiving indication information; and
the terminal device determining a first candidate SSB within a detected channel occupancy time (COT) as the first target SSB of the at least one target SSB, wherein the first candidate SSB within the COT that satisfies:
a quotient of an index of the resource location of the candidate SSB and D is k, wherein k is a positive integer, wherein D has a value of 2, 4 or 8;
wherein the indication information indicates at least one of the following information for at least one target synchronization signal block (SSB):
the at least one target SSB being a plurality of target SSBs, a number of candidate SSBs located in an interval between two adjacent target SSBs in the plurality of target SSBs;
a number of the at least one target SSB; or
a resource location of a first target SSB of the at least one target SSB.

2. The method according to claim 1, wherein
the indication information is specifically used to indicate at least one of the following information for the at least one target SSB:
the at least one target SSB being a plurality of target SSBs, a number of candidate SSBs located in an interval between two adjacent target SSBs of the plurality of target SSBs during a first period;
a number of the at least one target SSB in the first period; or
the resource location of the first target SSB during the first period,
wherein the number of the candidate SSBs within the first period is a predetermined value.

3. The method according to claim 2, wherein
the first period is an SSB period or a discovery reference signal (DRS) period.

4. The method according to claim 1, wherein
the indication information is only used to indicate at least one of the following information for the at least one target SSB:
a transmission interval of the at least one target SSB; or
the number of the at least one target SSB.

5. The method according to claim 1, further comprising:
the terminal device determining a first detected SSB as the first target SSB of the at least one target SSB.

6. The method according to claim 1, wherein
the indication information is used only to indicate at least one of the following information for the at least one target SSB:
a transmission interval of at least one target synchronization signal block (SSB); or
the resource location of the first target SSB of the at least one target SSB.

7. The method according to claim 1, wherein
the indication information is only used to indicate at least one of the following information for the at least one target SSB:
the number of the at least one target SSB; or
the resource location of the first target SSB of the at least one target SSB.

8. The method according to claim 7, wherein
the at least one target SSB is contiguous in resource locations of the candidate SSBs.

9. The method according to claim 1, further comprising:
the terminal device receiving the at least one target SSB according to the indication information.

10. The method according to claim 9, further comprising:
the terminal device detecting at least one of a physical downlink control channel (PDCCH) or a physical downlink shared channel (PDSCH) according to the indication information.

11. The method according to claim 10, wherein
the terminal device detecting the at least one of the physical downlink control channel (PDCCH) or the physical downlink shared channel (PDSCH) according to the indication information, comprises at least one of:
the terminal device determining, according to the indication information, that no PDSCH will be transmitted at a resource location that overlaps with a resource location of the at least one target SSB;
the terminal device, according to the indication information, not detecting a PDCCH at a resource location that overlaps or partially overlaps with a resource location of the at least one target SSB; or
the terminal device, according to the indication information, not detecting the PDCCH if the PDCCH overlaps or partially overlaps with a resource location of at least one target SSB when detecting PDCCHs.

12. The method according to claim 1, further comprising:
the terminal device measuring the at least one target SSB according to the indication information.

13. The method according to claim 12, wherein
the terminal device receiving the indication information comprises:
the terminal device receiving a physical broadcast channel (PBCH), the PBCH comprising the indication information;
the terminal device receiving a master information block (MIB), the MIB comprising the indication information; or
the terminal device receiving radio resource control (RRC) signaling, the RRC signaling comprising the indication information.

14. The method according to claim 1, wherein
the indication information indicates, by means of a different demodulation reference signal (DMRS) of a physical broadcast channel (PBCH), at least one of the following information for the at least one target SSB:
the at least one target SSB being a plurality of target SSBs, the number of candidate SSBs located in an interval between two adjacent target SSBs in the plurality of target SSBs;
the number of the at least one target SSB; or
the resource location of the first target SSB of the at least one target SSB.

15. A method for transmitting information, comprising:
a network device sending indication information, wherein the indication information indicates at least one of the following information for at least one target synchronization signal block (SSB):
the at least one target SSB being a plurality of target SSBs, a number of candidate SSBs located in an interval between two adjacent target SSBs of the plurality of target SSBs;
a number of the at least one target SSB; or
a resource location of a first target SSB of the at least one target SSB;
wherein a first candidate SSB within a detected channel occupancy time (COT) is the first target SSB of the at least one target SSB, wherein the first candidate SSB within the COT that satisfies:
a quotient of an index of the resource location of the candidate SSB and D is k, wherein k is a positive integer, wherein D has a value of 2, 4 or 8.

16. The method according to claim 15, wherein
the indication information is specifically used to indicate at least one of the following information for the at least one target SSB:
the at least one target SSB being a plurality of target SSBs, a number of candidate SSBs located in an interval between two adjacent target SSBs of the plurality of target SSBs during a first period;
a number of the at least one target SSB in the first period; or
the resource location of the first target SSB during the first period,
wherein the number of the candidate SSBs within the first period is a predetermined value.

17. A terminal device, comprising:
a processor;
a memory; and
a transceiver, wherein the memory is configured to store a computer program, the processor is configured to call and run the computer program stored in the memory, causing the transceiver to perform:
receiving indication information, wherein the indication information indicates at least one of the following information for at least one target synchronization signal block (SSB):
the at least one target SSB being a plurality of target SSBs, a number of candidate SSBs located in an interval between two adjacent target SSBs in the plurality of target SSBs;
a number of the at least one target SSB; or
a resource location of a first target SSB of the at least one target SSB; and
determining a first candidate SSB within a detected channel occupancy time (COT) as the first target SSB of the at least one target SSB, wherein the first candidate SSB within the COT that satisfies:
a quotient of an index of the resource location of the candidate SSB and D is k, wherein k is a positive integer, wherein D has a value of 2, 4 or 8.

18. A network device, comprising:
a processor;
a memory; and
a transceiver, wherein the memory is configured to store a computer program, the processor is configured to call and run the computer program stored in the memory, causing the transceiver to perform:
sending indication information, wherein the indication information indicates at least one of the following information for at least one target synchronization signal block (SSB):
the at least one target SSB being a plurality of target SSBs, a number of candidate SSBs located in an interval between two adjacent target SSBs of the plurality of target SSBs;
a number of the at least one target SSB; or
a resource location of a first target SSB of the at least one target SSB;
wherein a first candidate SSB within a detected channel occupancy time (COT) is the first target SSB of the at least one target SSB, wherein the first candidate SSB within the COT that satisfies:

a quotient of an index of the resource location of the candidate SSB and D is k, wherein k is a positive integer, wherein D has a value of 2, 4 or 8.

\* \* \* \* \*